(12) United States Patent
Saraswathyamma et al.

(10) Patent No.: US 10,411,742 B2
(45) Date of Patent: Sep. 10, 2019

(54) LINK AGGREGATION CONFIGURATION FOR A NODE IN A SOFTWARE-DEFINED NETWORK

(71) Applicant: HEWLETT PACKARD ENTERPRISE DEVELOPMENT LP, Houston, TX (US)

(72) Inventors: Prasanth Gopinathan Nair Saraswathyamma, Bangalore (IN); Vijeesh Erankotte Panayamthatta, Bangalore (IN); Celestian K. Sebastian, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 141 days.

(21) Appl. No.: 15/500,836

(22) PCT Filed: Nov. 6, 2014

(86) PCT No.: PCT/US2014/064241
§ 371 (c)(1),
(2) Date: Jan. 31, 2017

(87) PCT Pub. No.: WO2016/048390
PCT Pub. Date: Mar. 31, 2016

(65) Prior Publication Data
US 2017/0230065 A1    Aug. 10, 2017

(30) Foreign Application Priority Data

Sep. 26, 2014  (IN) .......................... 4726/CHE/2014

(51) Int. Cl.
*H04B 1/00*        (2006.01)
*H04L 12/64*       (2006.01)
(Continued)

(52) U.S. Cl.
CPC ....... *H04B 1/0003* (2013.01); *H04L 12/4604* (2013.01); *H04L 12/6418* (2013.01);
(Continued)

(58) Field of Classification Search
CPC . H04B 1/0003; H04L 45/245; H04L 12/6418; H04L 47/125; H04L 41/12; H04L 12/4604; H04L 2012/5667
(Continued)

(56) References Cited

U.S. PATENT DOCUMENTS 8,670,352 B2 *  3/2014  Uppalli ............... H04L 12/4625
                                                 370/254
9,025,459 B2 *  5/2015  Fung .................... H04L 47/125
                                                 370/235
(Continued)

FOREIGN PATENT DOCUMENTS

EP          2747355 A1     6/2014
WO     WO-2013113265 A1    8/2013

OTHER PUBLICATIONS

International Search Report and Written Opinion, International Application No. PCT/US2014/064241, dated May 15, 2015, pp. 1-8, KIPO.

(Continued)

*Primary Examiner* — Brian T O Connor
(74) *Attorney, Agent, or Firm* — Hewlett Packard Enterprise Patent Department

(57) ABSTRACT

In some examples, a software-defined network (SDN) controller determines a link aggregation (LAG) configuration for a node in the SDN that is controlled by the SDN controller. The LAG configuration is based on hardware capability information and dynamic network traffic infor-
(Continued)

mation of the SDN. The SDN controller can further instruct the node to forward traffic in accordance with the LAG configuration.

15 Claims, 4 Drawing Sheets

(51) Int. Cl.
    *H04L 12/46*     (2006.01)
    *H04L 12/24*     (2006.01)
    *H04L 12/709*     (2013.01)
    *H04L 12/803*     (2013.01)
    *H04L 12/70*     (2013.01)

(52) U.S. Cl.
    CPC ............ *H04L 41/12* (2013.01); *H04L 45/245* (2013.01); *H04L 47/125* (2013.01); *H04L 2012/5667* (2013.01)

(58) Field of Classification Search
    USPC ......................................................... 370/235
    See application file for complete search history.

(56) References Cited

U.S. PATENT DOCUMENTS

| | | | | |
|---|---|---|---|---|
| 9,210,104 | B2* | 12/2015 | Fung | H04L 49/50 |
| 9,537,785 | B2* | 1/2017 | Bergeron | H04L 47/41 |
| 9,893,874 | B2* | 2/2018 | Ilyas | H04L 7/02 |
| 9,900,224 | B2* | 2/2018 | Dumitriu | H04L 12/4625 |
| 2009/0190580 | A1 | 7/2009 | Paramesh et al. | |
| 2011/0176544 | A1 | 7/2011 | Wong et al. | |
| 2012/0300675 | A1* | 11/2012 | Uppalli | H04L 12/4625 370/256 |
| 2012/0320926 | A1 | 12/2012 | Kamath et al. | |
| 2013/0024787 | A1* | 1/2013 | Polis | H04L 67/02 715/753 |
| 2013/0194914 | A1* | 8/2013 | Agarwal | H04L 45/245 370/225 |
| 2013/0266007 | A1 | 10/2013 | Kumbhare et al. | |
| 2014/0146664 | A1 | 5/2014 | Amante | |
| 2014/0169176 | A1* | 6/2014 | Brock | H04L 47/125 370/241 |
| 2014/0192645 | A1 | 7/2014 | Zhang et al. | |
| 2014/0195666 | A1* | 7/2014 | Dumitriu | H04L 12/4625 709/223 |
| 2014/0211661 | A1 | 7/2014 | Gorkemli et al. | |
| 2014/0307553 | A1* | 10/2014 | Fung | H04L 47/125 370/235 |
| 2015/0319070 | A1* | 11/2015 | Nachum | H04L 12/4633 370/400 |
| 2016/0197824 | A1* | 7/2016 | Lin | H04L 12/6418 370/389 |

OTHER PUBLICATIONS

Goshi Sato et al., "Network Link Selection Method for Disaster Oriented Mobile Network Based on Openflow Framework," Jul. 2013, pp. 326-330, IEEE.

Zemre Arslan et al., "A Traffic-Aware Controller Design for Next Generation Software Defined Networks," 2013, pp. 167-171, Istanbul Technical University, Istanbul-Turkey, IEEE.

* cited by examiner

LINK AGGREGATION CONFIGURATION FOR A NODE IN A SOFTWARE-DEFINED NETWORK

BACKGROUND

Computer networks can be used to allow networked devices, such as personal computers, servers, and data storage devices to exchange data. Computer networks often include intermediary datapath devices such as network switches, gateways, and routers, to flow traffic along selected data routing paths between networked devices. A data routing path can, for example, be selected by a network controller, administrator, or another entity, and can, for example, be based on network conditions, network equipment capabilities, or other factors.

DETAILED DESCRIPTION

Multiple physical links between adjacent nodes in a network can be combined in order to increase throughput, provide redundancy, balance data traffic, and/or provide other properties to achieve desired performance. This process is referred to herein as "Link Aggregation" (LAG). LAG can, for example, be implemented by allowing a node with LAG functionality (i.e., a "LAG node") itself to determine which physical link to route traffic to the adjacent downstream node. This determination can, for example, be based on packet metadata and port selection logic for forwarding the packet. In such an implementation, the port selection logic for forwarding a packet within a LAG may reside within the LAG node itself and can, for example, be in the form of a hash of a set of parameters for a given packet, such as Media Access Control (MAC) address, Internet Protocol (IP) address, Transmission Control Protocol (TCP) port, User Datagram Protocol (UDP) port, etc.

Such port selection logic may result in suboptimal LAG usage. In a simplified example demonstrating this issue, port selection logic stored locally on the LAG node can instruct the LAG node to check whether packets are received via a specific ingress port and, if so, to forward the packets along a specific LAG link to the adjacent downstream node using a specific LAG forwarding port. Based on such selection logic, it is appreciated that packets could be forwarded to a first LAG link to the adjacent downstream node that is currently experiencing heavy load even if a second LAG link to the adjacent downstream node is not being used.

Certain implementations of the present disclosure seek to address the above issues by decoupling the logic of LAG link selection from the LAG node and placing the logic with a software-defined network (SDN) controller. In some implementations, this decoupling can result in greater link utilization for certain data traffic by allowing the SDN controller to use dynamic network traffic information such as traffic type, load on each link, etc., in defining flow rules for a LAG node. Such an implementation can result in optimization of LAGs within the SDN. For example, in some implementations, LAG link control is centralized and done by an application running on an SDN controller that has visibility of the entire SDN to route traffic along certain LAG links to optimize LAG usage over the SDN. Additional advantages of the solutions presented herein will be apparent upon review of the description and figures.

Figure 1:
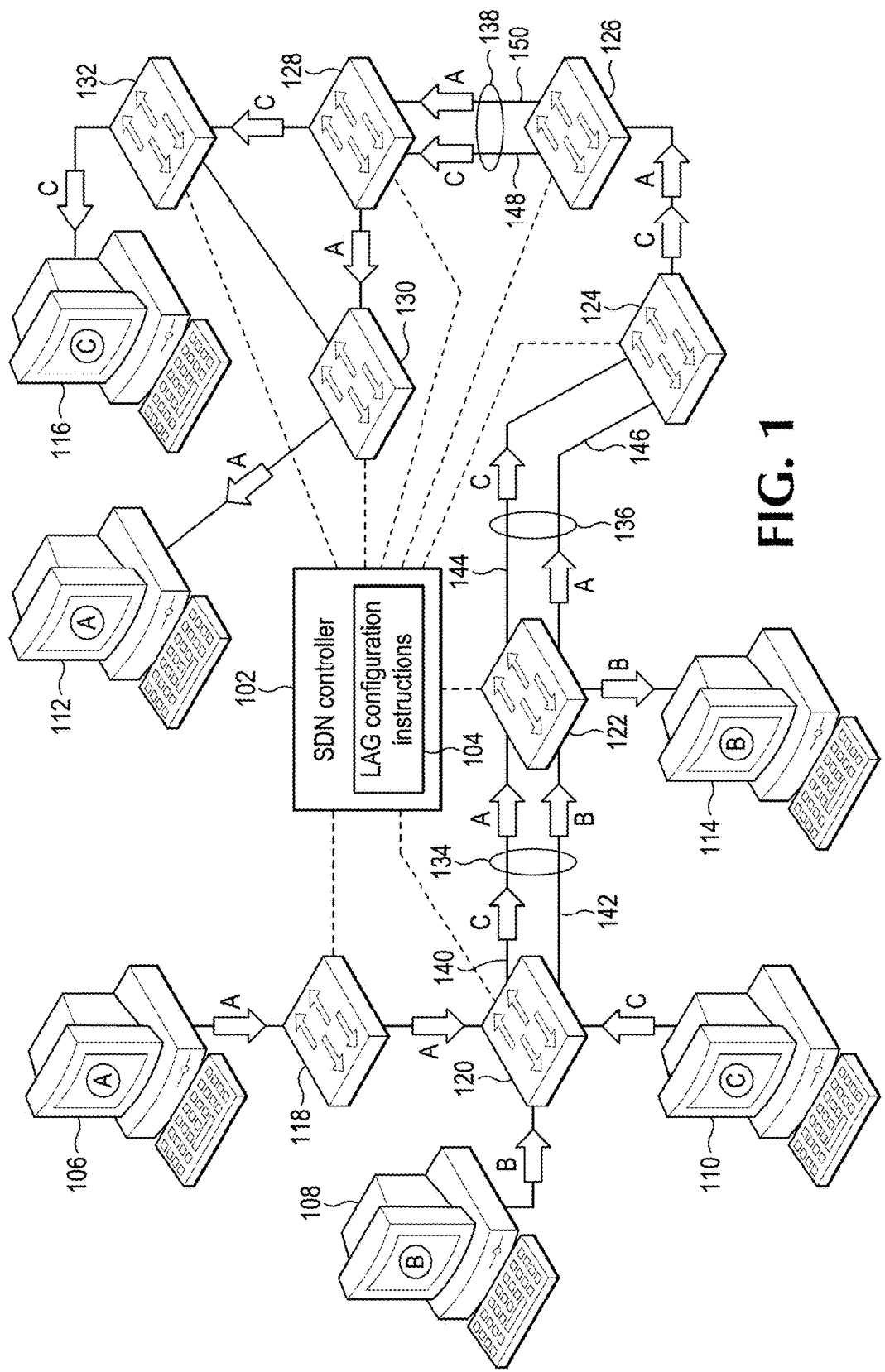
FIG. 1 is a diagram of a software-defined network with traffic along a first datapath, according to an example.

FIG. 1 is a diagram of an example software-defined network (SDN) 100 including an SDN controller 102 running LAG configuration instructions 104. In particular, FIG. 1 depicts traffic along several datapaths between three source nodes 106, 108, and 110, and respective destination nodes 112, 114, and 116. A first datapath carrying traffic labelled "A" in FIG. 1 between source node 106 and destination node 112 is defined by network nodes 118, 120, 122, 124, 126, 128, and 130. A second datapath carrying traffic labelled "B" in FIG. 1 is between source node 108 and destination node 114 is defined by network nodes 120 and 122. A third datapath carrying traffic labelled "C" in FIG. 1 is between source node 110 and destination node 116 is defined by network nodes 120, 122, 124, 126, 128, and 132. As further described below, SDN 100 includes several LAGs, which are depicted as double lines between adjacent nodes. In particular, a first LAG 134 is provided between node 120 and node 122, a second LAG 136 provided between node 122 and 124, and a third LAG 138 is provided between node 126 and 128. As a result, nodes 120, 122, and 126 provide LAG functionality and are herein referred to as "LAG nodes".

In SDN 100, control decisions for routing traffic through the network is decoupled from the network's physical infrastructure. For example, SDN controller 102 can be used to instruct network nodes to flow traffic along a selected routing path defined by the nodes. In some implementations, these nodes can, for example, be in the form of network switches or other intermediary network devices. The use of such software-defined networking can provide for other functionality. For example, SDN applications can be installed on or interface with SDN controller 102 to meet customer use cases, such as to achieve a desired throughput or other quality of service.

Source nodes 106, 108, and 110 and destination nodes 112, 114, and 116 can, for example, be in the form of network hosts or other suitable types of network nodes. For example, one or more of the source and destination nodes can be in the form of suitable servers, desktop computers, laptops, printers, etc. As but one example, source node 106 can be in the form of a desktop computer including a monitor for presenting information to an operator and a keyboard and mouse for receiving input from an operator, and destination node 112 can be in the form of a standalone storage server appliance. It is appreciated that the source and destination nodes can be endpoint nodes on SDN 100, intermediate nodes between endpoint nodes, or other types of network nodes.

Nodes 118, 120, 122, 124, 126, 128, 130, and 132 can, for example, be in the form of switches or other multi-port network bridges that process and forward data at the data link layer. In some implementations, one or more of the nodes can be in the form of multilayer switches that operate at multiple layers of the OSI model (e.g., the data link and network layers). Although the term "switch" is used throughout this description, it is appreciated that this term can refer broadly to other suitable network data forwarding devices. For example, a general purpose computer can include suitable hardware and machine-readable instructions that allow the computer to function as a network switch. It is appreciated that the term "switch" can include other network data path elements in the form of suitable routers, gateways and other devices that provide switch-like functionality for SDN 100.

Nodes within SDN 100 can forward traffic along a datapath based on metadata within the traffic. For example, traffic received at the node can be in the form of a packet. For illustration, the term "packet" is used herein, however, it is appreciated that "packet" can refer to any suitable protocol data unit (PDU). The packet can, for example, include payload data as well as metadata in the form of control data. Control data can, for example, provide data to assist the node with reliably delivering the payload data. For example, control data can include network addresses for source and destination nodes, error detection codes, sequencing information, and packet size of the packet. In contrast, payload data can include data carried on behalf of an application for use by a source node or destination node.

Each node within SDN 100 can, for example, help manage the flow of data across a network by only transmitting a received message to a destination device for which the message was intended (or to an intermediary device en route to the destination device). In some implementations, these nodes can rely on flow entries in flow tables stored on a machine-readable medium within each switch (or otherwise accessible by each switch). Each flow entry in a flow table can, for example, contain information such as: (1) match fields to match against packets (e.g., an ingress port and specific packet header fields), (2) a priority value for the flow entry to allow prioritization over other flow entries, (3) counters that are updated when packets are matched, (4) instructions to modify the action set or pipeline processing, and (5) timeouts indicating a maximum amount of time or idle time before a flow is expired by the switch, and (6) a cookie value which can be used by SDN controller 102 to filter flow statistics, flow modification, and flow deletion.

SDN controller 102 is connected to network nodes via various wired or wireless data links. For illustration, FIG. 1 depicts SDN controller 102 as being connected to network nodes via broken lines, which is intended to represent control channels rather than actual physical data links. It is appreciated that SDN controller 102 may be directly connected to only one or a few network nodes, while being indirectly connected to other nodes of SDN 100. As but one example, SDN controller 102 can be directly connected to node 120 via a data cable, while being indirectly connected to node 122 (e.g., by relying on node 120 as an intermediary for communication with node 122).

SDN 100 can, for example, interface with various SDN-compatible devices via a suitable Application Program Interface ("API"), or another suitable protocol (e.g., OpenFlow and/or simple network management protocol (SNMP)). In some implementations, SDN controller 102 may interface with controlled network devices via an interface channel that connects each controlled device to SDN controller 102 to allow SDN controller 102 to configure and manage each device, receive events from each device, and send packets using each device.

As used herein, the term "controlled" in the context of SDN-compatible network nodes, such as "controlled switches," is intended to include devices within the control domain of SDN controller 102 or otherwise controllable by SDN controller 102. Such a controlled node can, for example, communicate with SDN controller 102 and SDN controller 102 is able to manage the node in accordance with an SDN protocol, such as the OpenFlow protocol. For example, an OpenFlow-compatible switch controlled by SDN controller 102 can permit SDN controller 102 to add, update, and delete flow entries in flow tables of the switch using suitable SDN commands.

In the example SDN 100 depicted in FIG. 1, the various network nodes are in the form of intermediary nodes (e.g., controlled network switches) and host devices. It is appreciated however, that the implementations described herein can be used or adapted for networks including more or fewer devices, different types of devices, and different network arrangements. It is further appreciated that the disclosure herein can apply to suitable SDNs (e.g., certain hybrid or heterogeneous SDNs) in which some devices are controlled by SDN controller 102 and some devices are not controlled by SDN controller 102. For example, in some implementations, at least one node along a given data path is controlled by SDN controller 102 and at least one node along the given data path is not controlled by SDN controller 102.

The functionality of SDN controller 102 can, for example, be implemented in part using a software program on a standalone machine, such as a server. In some implementations, SDN controller 102 can be implemented on multipurpose machines, such as a suitable desktop computer, laptop, tablet, or the like. In some implementations, SDN controller 102 can be implemented on a suitable non-host network node, such as certain types of network switches. It is appreciated that the functionality of SDN controller 102 may be split among multiple controllers or other devices. For example, SDN 100 is described and illustrated as including only one SDN controller 102. However, it is appreciated that the disclosure herein can be implemented in SDNs with multiple controllers. For example, in some SDNs, network devices are in communication with multiple controllers such that control of the network can be smoothly handed over from a first controller to a second controller if a first controller fails or is otherwise out of operation. As another example, multiple controllers can work together to concurrently control an SDN. In such SDNs, a first controller can, for example, control certain network devices while a second controller can control other network devices. In view of the above, reference in this application to a single SDN controller 102 that controls the operation of SDN 100 is intended to include such multiple controller configurations (and other suitable multiple controller configurations).

For illustration, traffic labelled as "A", "B", or "C" is depicted flowing along links between nodes in SDN 100. For example, between node 118 and node 120, only "A" traffic is flowing, whereas between node 122 and 124, both "A" traffic and "C" traffic is flowing. As described further below with respect to FIG. 1 and its related methods, SDN controller 102 includes machine-readable LAG configuration instructions 104, which can, for example, be used to determine flow rules for individual physical ports of a LAG node that are part of a LAG and to install the flow rules on the LAG node. In the example SDN 100 of FIG. 1, LAG node 118 is instructed by SDN controller 102 to flow "A" and "C" traffic from a first physical port of LAG node 120 along first LAG link 140, and to flow "B" traffic from a second physical port of LAG node 120 along second LAG link 142. In the example SDN 100 of FIG. 1, LAG node 122 is instructed by SDN controller 102 to flow "C" traffic from a first physical port of LAG node 122 along first LAG link 144, and to flow "A" traffic from a second physical port of LAG node 122 along second LAG link 146. In the example SDN 100 of FIG. 1, LAG node 126 is instructed by SDN controller 102 to flow "C" traffic from a first physical port of LAG node 126 along first LAG link 148, and to flow "A" traffic from a second physical port of LAG node 126 along second LAG link 150. Specific details regarding the determination and installation of LAG configuration instructions on LAG nodes 120, 122, and 126 will be provided below for example with respect to the method of FIG. 2.

Figure 2:
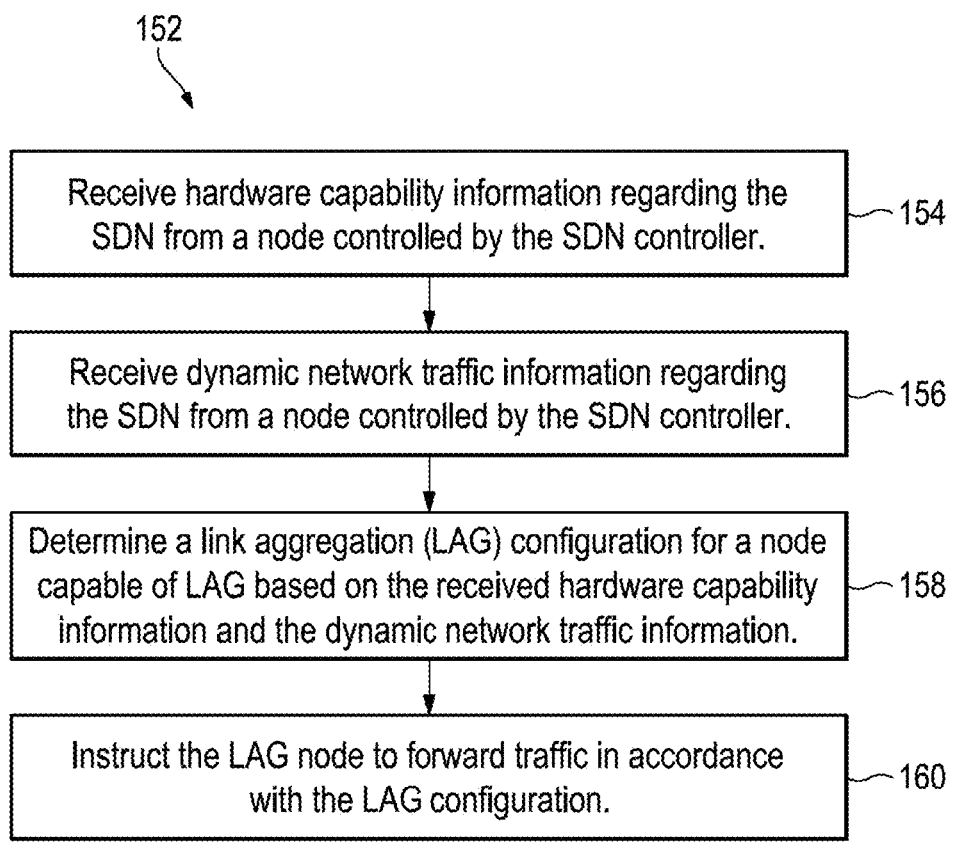
FIG. 2 is a flowchart illustrating a method, according to an example.

FIG. 2 illustrates a flowchart for a method 152 relating to the use of an SDN controller to determine flow rules for individual physical ports of a LAG node and to install flow rules on the LAG node. For illustration, the description of method 152 and its component steps make reference to example SDN 100 and elements thereof, such as LAG node 120. However, it is appreciated that method 152 or aspects thereof can be used or otherwise applicable for any suitable network or network element described herein or otherwise. For example, method 152 can be applied to computer networks with different network topologies than that illustrated in FIG. 1.

Method 152 includes a step 154 of receiving hardware capability information regarding SDN 100 from a controlled network node in SDN 100. The hardware capability information can, for example, include information identifying the capacity of a first LAG port (for first LAG link 140) of LAG node 120 and the capacity of a second LAG port (for second LAG link 142) of LAG node 120. It is appreciated that the term "capacity" as described herein relating to LAG ports, can further include capacity-related aspects of such LAG ports, such as port speed. As but one example, the hardware capability information can identify that the first LAG port has a 1 mbps capacity and the second LAG port has a 100 mbps capacity. In some implementations, the hardware capability information can include hardware capability information regarding other aspects of first LAG link 140 and second LAG link 142. For example, the hardware capability information can identify that an ingress port of downstream node 122 along first LAG link 140 has a 1 mbps capacity and an ingress port of downstream node 122 along second LAG link 142 has a 100 mbps capacity. It is appreciated that other hardware capability information of LAG node 120 or LAG links can be provided. For example, hardware capability information of LAG node 120 can be in the form of processor specifications for LAG node 120.

In some implementations, step 154 of receiving hardware capability information regarding LAG node 120 can be in response to SDN controller 102 querying LAG node 120 to determine whether LAG node 120 is capable of LAG functionality. This query can, for example, be communicated to LAG node 120 over a control channel of SDN 100 or another suitable channel. In such implementations, SDN controller 102 can receive a response to the query from LAG node 120 or another suitable node (e.g., downstream node 122). For example, the response can include information indicating whether LAG node 120 is capable of LAG functionality along with information identifying individual ports of each identified LAG on LAG node 120. In some implementations, statistics relating to individual ports on LAG node 120 can be queried by SDN controller 102. In some implementations, information such as port capacity (e.g., whether a port is a 1 mbps port, 100 mbps port, etc.), processor capability, etc., can be queried by SDN controller 102. In some implementations, SDN controller 102 can query every controlled node within SDN 100 to determine whether each node is capable of LAG functionality and each node's respective hardware capabilities.

Method 152 includes a step 156 of SDN controller 102 receiving dynamic network traffic information regarding SDN 100 from a controlled network node in SDN 100. Such dynamic network traffic information can, for example, include real-time or predicted traffic over SDN 100, loads over specific links of SDN 100 (e.g., first LAG link 140 and second LAG link 142), traffic type, latency sensitivity of traffic type, etc. Further examples of dynamic network traffic information are provided below with respect to step 158 of method 152.

In some implementations, step 156 of receiving dynamic network traffic information can be in response to SDN controller 102 querying controlled nodes of SDN 100 to determine. This query can, for example, be provided to the controlled nodes over a control channel or another suitable channel. In such implementations, SDN controller 102 can receive a response to the query from each controlled node in SDN 100. For example, the controlled nodes can provide information identifying current or predicted loads on individual ports of each node. In some implementations, SDN controller 102 can query every controlled node within SDN 100 to store dynamic network traffic information for SDN 100. Responses for every controlled node (or a subset thereof) can then be received by SDN controller 102 to determine a more complete picture of network traffic over SDN 100.

Method 152 includes a step 158 of determining, with SDN controller 102, a LAG configuration for a node (e.g., LAG node 120) controlled by SDN controller 102. The LAG configuration can, for example, include flow rules for individual physical ports of the node that are part of a LAG. For example, an example LAG configuration can include a first set of flow rules for forwarding traffic over a first LAG link (e.g., link 140) through a first physical LAG port connected to a downstream node (e.g., node 122) and a second set of flow rules for forwarding traffic over a second LAG link (e.g., link 142) through a second physical LAG port connected to the same downstream node (node 122). The LAG configuration can, for example be used to provide LAG functionality between node 120 and node 122 in order to increase throughput, provide redundancy, balance data traffic, and/or other provide other properties achieve desired performance.

The determination of a specific LAG configuration for a node can be based on several aspects of SDN 100. For example, in some implementations, a LAG configuration can be determined based on the hardware capabilities, such as those described above with respect to step 154. For example, in some implementations, a flow rule for LAG node 120 can be based on hardware capabilities of each LAG port, such as port capacity. For example, if a first LAG port has a 1 mbps capacity and a second LAG port has a 100 mbps capacity, then SDN controller 102 can favor forwarding traffic out of the second LAG port.

As another example, in some implementations, a LAG configuration can be additionally determined based on parameters pulled from traffic metadata, such as MAC address, IP address, TCP port, UDP port, etc. Such traffic metadata can, for example, be in the form of control information that matches control information of the flow rule. In such an implementation, a flow rule for node 120 can be based on a destination MAC address of the traffic. For example, if the traffic is to be delivered to a first MAC address, then the SDN controller 102 can favor forwarding traffic out of a first LAG port, and if the traffic is to be delivered to a second MAC address, then the SDN controller can favor forwarding traffic out of a second LAG port.

In some implementations, the LAG configuration can be additionally determined based on dynamic network traffic information regarding SDN 100, such as those described above with respect to step 156. For example, in some implementations, a flow rule for LAG node 120 can be based on load over each LAG link. For example, if first LAG link 140 is experiencing a significantly higher load than second LAG link 142, then SDN controller 102 can favor forwarding traffic over second LAG link 142. As another example, in some implementations, a LAG configuration can be additionally determined based on dynamic network traffic information such as traffic type. In such an implementation, a flow rule for LAG node 120 can be based on a latency sensitivity of a type of traffic received by the node. For example, high priority/latency sensitive traffic can be forwarded through a dedicated link in LAG (e.g., LAG link 140), but when such sensitive traffic is not present, the same link can be used for normal traffic load-balancing. In some implementations, SDN controller 102 can re-configure an existing LAG configuration to create a dedicated link for high latency traffic by redistributing traffic along ports of the LAG. In some implementations, the type of traffic can correspond to a particular protocol of traffic, such as UDP traffic or TCP traffic. As another example, in some implementations, a LAG configuration can be determined based on dynamic network traffic information accessible by an SDN application running on SDN controller 102. For example, the SDN application can determine flow rules based on a quantity, type, or other aspects of data that has been received by the SDN application over a period of time. In some implementations, SDN controller 102 can update a LAG configuration for LAG node 120 based on dynamic events within SDN 100. For example, an SDN application running on SDN controller 102 can determine that no more traffic is expected for a specific application process. Once the traffic is completed, SDN controller 102 can determine an updated LAG configuration based on existing network traffic conditions and provide LAG node 120 with the updated LAG configuration. In some implementations, SDN controller 102 can determine an updated LAG configuration based on future predicted network traffic conditions and provide LAG node 120 with the updated LAG configuration for application when the predicted network traffic conditions are expected to occur. For example, SDN controller 102 can provide LAG node 120 with a timer, the expiration of which triggers LAG node 120 to apply the updated LAG configuration. As another example, SDN controller 102 can provide LAG node 120 with a LAG configuration to be applied by LAG node 120 when a specific type of packet (or a packet including certain control information) is received by LAG node 120.

Method 152 includes a step 160 of SDN controller 102 instructing LAG node 120 to forward traffic in accordance with the LAG configuration. As described above, the LAG configuration can include flow rules for each physical LAG port of LAG node 120. LAG node 120 can receive LAG configuration from SDN controller 102 over a control channel or other suitable channel. Once LAG node 120 receives the LAG configuration, it can extract the flow rules and apply the rules to each LAG port of LAG node 120.

As described above, the LAG configuration for LAG node 120 can, in some implementations, be updated based on dynamic or other parameters of SDN 100. In such implementations, a first determined LAG configuration can be provided to LAG node 120 for use during a first time period, and a second determined LAG configuration can be provided to LAG node 120 for use during a second time period. The first and second time periods can, in some implementations be sequential, spaced apart, or overlapping. As but one example, the first determined LAG configuration can be installed for routing traffic from 0-20 seconds, and the second determined LAG configuration can be installed for routing traffic from 20-40 seconds. As another example, the first determined LAG configuration can be installed for routing traffic from 0-20 seconds, and the second determined LAG configuration can be installed for routing traffic from 30-40 seconds. As another example, the first determined LAG configuration can be installed for routing traffic from 0-20 seconds, and the second determined LAG configuration can be installed for routing traffic from 10-30 seconds.

Figure 3:
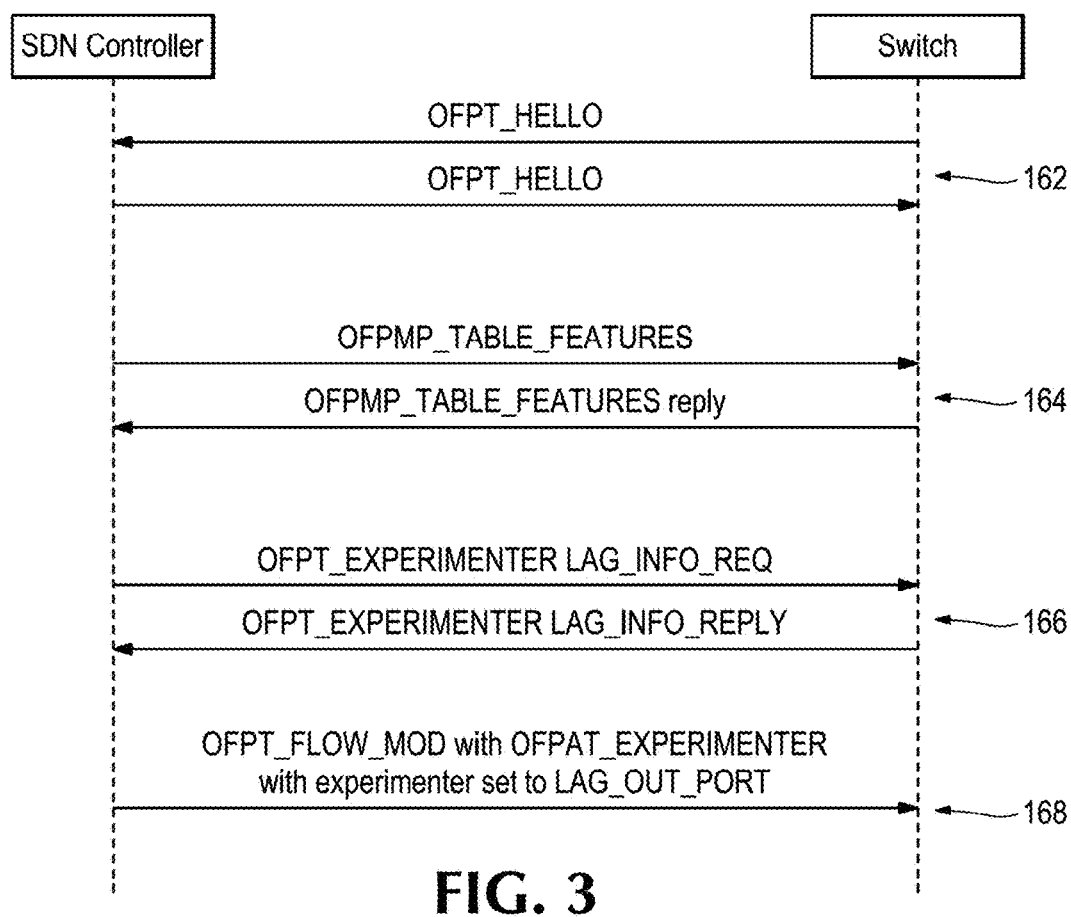
FIG. 3 is a message exchange diagram for an example communication between an SDN controller and a controlled node.

FIG. 3 depicts a message exchange diagram for communication between an SDN controller and a controlled LAG node. For illustration, the description of FIG. 3 and its component messages make reference to example SDN 100 and elements thereof, however, it is appreciated that the message exchange of FIG. 3 or aspects thereof can be used or otherwise applicable for any suitable network or network element described herein or otherwise. In the example of FIG. 3, commands relating to the use of the OpenFlow protocol are used. However, it is appreciated that other suitable SDN protocols may be used. Moreover, the term "switch" is used in the description of FIG. 3 for illustration, however it is appreciated that other network devices with switch-like functionality can be used with such a method.

The example of FIG. 3 makes use of "EXPERIMENTER"-type messages provided by the OpenFlow specification for customized applications/features meant for future OpenFlow revisions. At 162, the controller and switch exchange HELLO and Table Features request and reply messages. At 164, OFPT_EXPERIMENTER is used to query for LAG information. For example, the controller requests for LAG information through OFPT_EXPERIMENTER synchronous message with the LAG_INFO_REQ as the exp_type. At 166, the switch replies back with OFPT_EXPERIMENTER synchronous message with the LAG_INFO_RESP as the exp_type. The message contains information on the LAG ports configured. The message also has additional information on the physical ports associated with each of the LAG port. At 168, OFPAT_EXPERIMENTER is used to set a physical port of a LAG port as an output port. For example, an SDN application running on the controller configures a rule using the OFPT_FLOW_MOD request. The actions part of the rule has the OFPAT_EXPERIMENTER as the action type. The experimenter field indicates that the action is LAG_OUT_PORT (a port part of the LAG port in the switch). Flows hitting the switch that match the rule will then go out of the physical port part of the LAG as configured by the controller.

Figure 4:
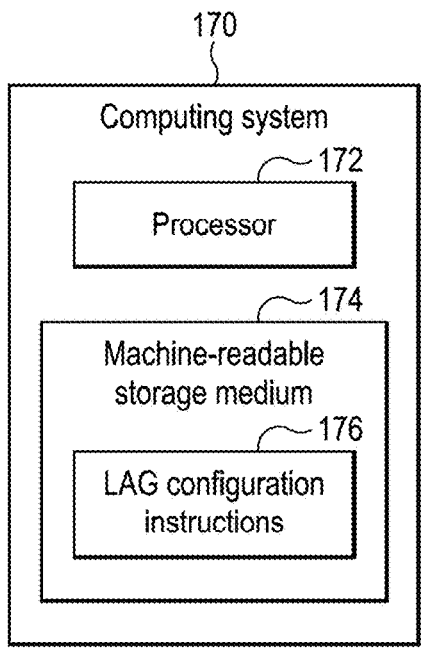
FIG. 4 is a diagram of a computing system that includes LAG configuration instructions, according to an example.

FIG. 4 illustrates an example SDN controller in the form of a computing system 170 for running LAG configuration instructions 104 in accordance with the present disclosure. Computing system 170 can, for example, be used to provide switch functionality for a network by executing one or more steps of method 152 or other methods described herein. The description of computing system 170 refers to elements of SDN 100 for illustration, however, it is appreciated that computing system 170 can be used with any suitable network. Computing system 170 includes a processor 172 and machine-readable storage medium 174 as described further below. It is appreciated that computing system 170 can include additional elements, such as input/output (I/O) devices, a communication interface, etc. It is appreciated that one or hardware or software elements for SDN controller 102 described herein may be implemented in computing system 170. In some implementations, software that provides the functionality of SDN controller 102 can be stored on machine-readable storage medium 174 of computing system 170 to be executed by processor 172 of computing system 170.

Processor 172 of computing system 170 can, for example, be in the form of a central processing unit (CPU), a semiconductor-based microprocessor, a digital signal processor (DSP) such as a digital image processing unit, other hardware devices or processing elements suitable to retrieve and execute instructions stored in medium 174, or suitable combinations thereof. Processor 172 can, for example, include single or multiple cores on a chip, multiple cores across multiple chips, multiple cores across multiple devices, or suitable combinations thereof. Processor 172 can be functional to fetch, decode, and execute instructions as described herein. As an alternative or in addition to retrieving and executing instructions, processor 172 can, for example, include at least one integrated circuit (IC), other control logic, other electronic circuits, or suitable combination thereof that include a number of electronic components for performing the functionality of instructions stored on medium 174. Processor 172 can, for example, be implemented across multiple processing units and instructions may be implemented by different processing units in different areas of computing system 170.

Medium 174 of computing system 170 can, for example, be in the form of a non-transitory machine-readable storage medium, such as a suitable electronic, magnetic, optical, or other physical storage apparatus to contain or store information such as LAG configuration instructions 104. LAG configuration instructions 104 can be machine readable instructions executable by processor 172 such that computing system 170 is operative to perform one or more functions described herein, such as those described above with respect to method 152 or other methods described herein. In some implementations, medium 174 can store LAG configuration rules associated with determining LAG configurations based on hardware capabilities and/or dynamic network traffic information for SDN 100.

Medium 174 can, for example, be housed within the same housing as processor 172 for computing system 170, such as within a computing tower case for computing system 170. In some implementations, medium 174 and processor 172 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, medium 174 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that instructions and data can be stored on separate machine-readable storage mediums and multiple mediums can be treated as a single medium 174 for purposes of description.

Figure 5:
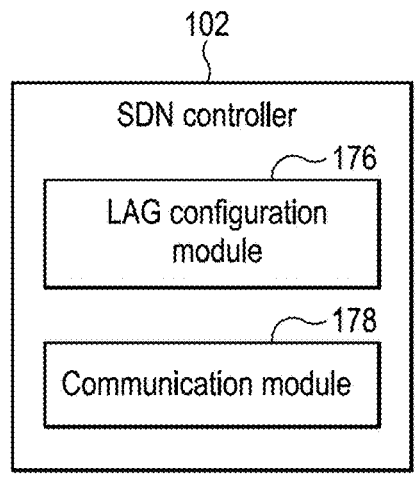
FIG. 5 is a diagram of an SDN controller that includes LAG configuration instructions, according to an example.

FIG. 5 illustrates SDN controller 102 in the form of functional modules that can, for example, be operative to execute one or more steps of method 152 or other methods described herein. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "module" is intended to mean one or more modules or a combination of modules. Each module of SDN controller 102 can include one or more machine-readable storage mediums, such as medium 174, and one or more computer processors, such as processor 172. For example, software that provides the functionality of modules on SDN controller 102 can be stored on a memory of a computer to be executed by a processor of the computer.

The implementation of SDN controller 102 of FIG. 5 includes a LAG configuration module 176 and a communication module 178 as described further below. It is appreciated that other modules can be added to SDN controller 102 for additional or alternative functionality. For example, another implementation of SDN controller 102 (described with respect to FIG. 6) includes additional modules, such as a node querying module.

LAG configuration determination module 176 of SDN controller 102 includes a combination of hardware and software to allow SDN controller 102 to determine a LAG configuration for a LAG node (e.g., LAG node 120) controlled by SDN controller 102. In some implementations, the LAG configuration can include flow rules for the node to forward traffic along LAG ports of the LAG node. LAG configuration determination module 176 can, for example, include one or more machine-readable storage mediums, such as medium 174, and one or more computer processors, such as processor 172, to implement one or more aspects of steps 154, 156, and 158 (or other steps) of method 152 described above with respect to FIG. 2.

Communication module 178 of SDN controller 102 includes a combination of hardware and software to allow SDN controller 102 to connect to the switch to provide instructions to the switch to forward traffic in accordance with the LAG configuration. Communication module 178 can, for example, include one or more machine-readable storage mediums, such as medium 174, and one or more computer processors, such as processor 172, to implement one or more aspects of step 160 (or other steps) of method 152 described above with respect to FIG. 2. In some implementations, communication module 178 is configured to query the network node to determine LAG ports including the individual physical ports that are part of each LAG on the node.

Figure 6:
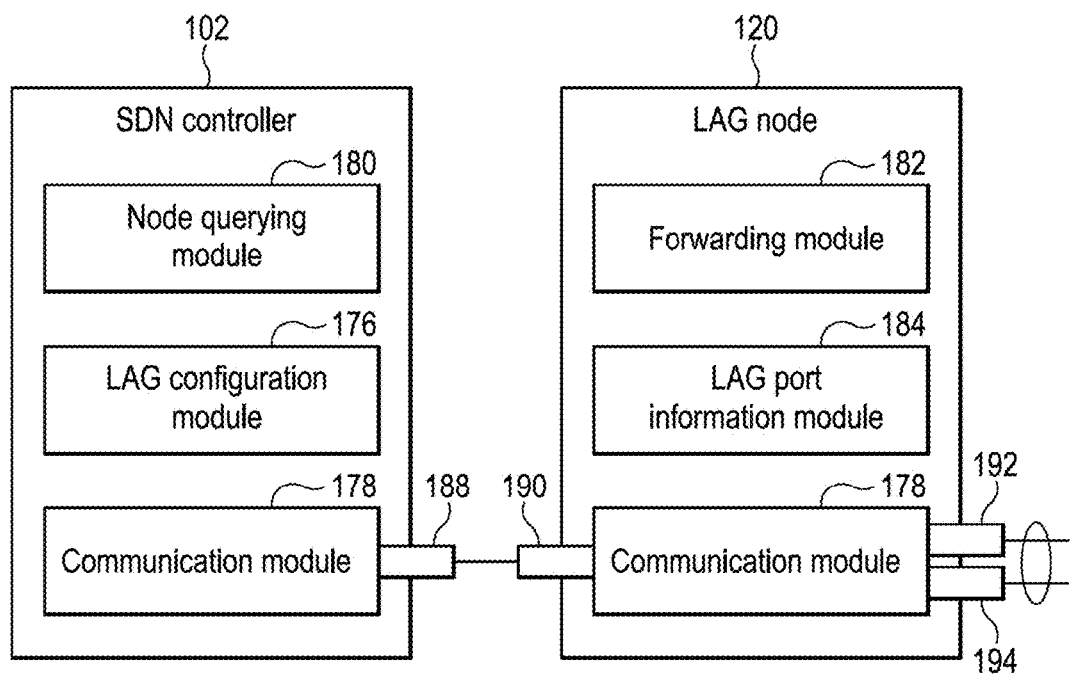
FIG. 6 is a diagram of an SDN controller and a controlled node, according to an example.

FIG. 6 is a diagram of another example of SDN controller 102 and an example LAG node (e.g., LAG node 120 of FIG. 1 for illustration) in the form of functional modules. SDN controller 102 and LAG node 120 can, for example, be operative to execute one or more steps of method 152 or other methods described herein. SDN controller 102 as depicted in FIG. 6 includes LAG configuration determination module 176 and communication module 178, examples of which are described above with respect to FIG. 5. SDN controller 102 of FIG. 6 further includes additional aspects of communication module 178 as well as a node querying module 180, as described in further detail below. LAG node 120 includes forwarding module 182, LAG port information module 184, and communication module 186 as described in further detail below.

Node querying module 180 of SDN controller 102 includes a combination of hardware and software to allow SDN controller 102 to query one or more nodes of SDN 100 to provide the SDN controller with information regarding individual LAG ports of each node. Node querying module 180 can, for example, include one or more machine-readable storage mediums, such as medium 174, and one or more computer processors, such as processor 172, to implement one or more aspects of step 154, 156, or 158 (or other steps) of method 152 described above with respect to FIG. 2.

As depicted, for example, in the implementation of SDN controller 102 of FIG. 5, communication module 178 can include one or more physical data ports 188 to connect to elements of SDN 100. For example, in some implementations, communication module 178 can include a network interface controller having an Ethernet port. In some implementations, communication module 178 can include wired or wireless communication interface. Communication module 178 can, in some implementations, provide for virtual network ports. In some implementations, communication module 178 includes hardware in the form of a hard drive, related firmware, and other software for allowing the hard drive to operatively communicate with other hardware of SDN controller 102. Communication module 178 can include information for use with communication module 178, such as firmware for implementing physical or virtual network ports.

In some implementations, SDN controller 102 can include an I/O module that is a combination of hardware and software to allow an operator to view and/or interact with SDN controller 102. Example of suitable I/O modules can include modules for monitors, printers, keyboards, mouses, styluses, touchscreens, speakers, etc. I/O devices for such modules can be connected to elements of SDN controller 102 via wired or wireless links.

Forwarding module 182 of LAG node 120 includes a combination of hardware and software to allow LAG node 120 to extract a set of fields from a received data packets to determine flow routing instructions and to forward the packet according to the flow routing instructions. Forwarding module 182 can, for example, include one or more machine-readable storage mediums, such as a medium similar to medium 174 of computing system 170 described above, and one or more computer processors, such as a processor similar to processor 172 of computing system 170 described above, to implement one or more aspects of step 154, 156, or 158 (or other steps) of method 152 described above with respect to FIG. 2.

LAG port information module 184 of LAG node 120 includes a combination of hardware and software to allow LAG node 120 to provide SDN controller 102 with LAG port information, such as identities of LAG ports, hardware capabilities of LAG node 120 or other elements of SDN 100, etc. LAG port information module 184 can, for example, include one or more machine-readable storage mediums, such as a medium similar to medium 174 of computing system 170 described above, and one or more computer processors, such as a processor similar to processor 172 of computing system 170 described above, to implement one or more aspects of step 154, 156, or 158 (or other steps) of method 152 described above with respect to FIG. 2.

Communication module 186 of LAG node 120 includes a combination of hardware and software to allow LAG node 120 to directly or indirectly communicate with SDN controller 102 and other nodes of SDN 100. As depicted in FIG. 6, LAG node 120 includes a first port 190, which can receive control information from SDN controller as well as other incoming network traffic. LAG node 120 further includes a first LAG port 192 for forwarding traffic along first LAG link 140 to adjacent downstream node (e.g., node 122), and a second LAG port 194 for forwarding traffic along second LAG link 142 to the same adjacent downstream node in SDN 100. Although two LAG ports are described herein for illustration, it is appreciated that LAG node 120 or any other LAG node described herein can include more than two LAG ports. For example, in some implementations, LAG node 120 includes up to eight LAG ports. Communication module 186 of LAG node 120 can, for example, include one or more machine-readable storage mediums, such as a medium similar to medium 174 of computing system 170 described above, and one or more computer processors, such as a processor similar to processor 172 of computing system 170 described above, to implement one or more aspects of step of method 152 described above with respect to FIG. 2.

Communication module 186 of LAG node 120 can include one or more physical data ports as described above (e.g., ports 190, 192, and 194) to connect to elements of SDN 100. For example, in some implementations, communication module 186 can include a network interface controller having multiple Ethernet ports. In some implementations, communication module 186 can include wired or wireless communication interface. Communication module 186 can, in some implementations, provide for virtual network ports. In some implementations, communication module 186 includes hardware in the form of a hard drive, related firmware, and other software for allowing the hard drive to operatively communicate with other hardware of SDN controller 102. Communication module 186 can include information for use with communication module 186, such as firmware for implementing physical or virtual network ports.

It is appreciated that certain modules described herein or otherwise can, in some implementations, share hardware, software, or data with other modules. As but one example, in some implementations, LAG configuration module 176 and communication module 178 can share a computer-readable medium (e.g., medium 174), whereas in some implementations, LAG configuration module 176 and communication module 178 use separate mediums. It is appreciated that any modules can share hardware, software, or data with any other module in order to achieve their respective objectives.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules or elements in other implementations.

As used herein, the term "provide" includes push mechanisms (e.g., sending data independent of a request for that data), pull mechanisms (e.g., delivering data in response to a request for that data), and store mechanisms (e.g., storing data at an intermediary at which the data can be accessed). Furthermore, as used herein, the term "based on" means "based at least in part on." Thus, a feature that is described based on some cause, can be based only on the cause, or based on that cause and on one or more other causes.

Furthermore, it should be understood that the systems, networks, and methods described herein can include various combinations and/or sub-combinations of the components and/or features of the different implementations described. Thus, features described with reference to one or more implementations can be combined with other implementations described herein.

What is claimed is:

1. A method comprising:
receiving, with a software-defined network (SDN) controller in an SDN, hardware capability information regarding the SDN from a node controlled by the SDN controller;
receiving, with the SDN controller, dynamic network traffic information regarding the SDN from a node controlled by the SDN controller, including an address of a destination device of a flow;
determining, with the SDN controller, a link aggregation (LAG) configuration for a node capable of LAG (LAG node) based on the received hardware capability information and the dynamic network traffic information, including the address of the destination device of the flow, wherein the LAG node is to implement a LAG by using a first physical LAG port of the LAG node to communicate with an adjacent downstream node over a first LAG link and by using a second physical LAG port of the LAG node to communicate with the adjacent downstream node over a second LAG link, wherein the LAG configuration includes flow rules for the first physical LAG port and the second physical LAG port, and wherein the flow rules include a flow rule for the flow; and
instructing, with the SDN controller, the LAG node to forward traffic in accordance with the LAG configuration.

2. The method of claim 1, further comprising:
querying, with the SDN controller, the LAG node to provide to the SDN controller LAG information regarding LAG ports of the LAG node; and
receiving, with the SDN controller, a response from the LAG node in response to the query, the response including LAG information identifying the first physical LAG port and the second physical LAG port of the LAG node, the response further including hardware capabilities of the first physical LAG port and the second physical LAG port.

3. The method of claim 1, wherein the dynamic network traffic information includes a current network traffic load over each port in the LAG, and
wherein the SDN controller determines a LAG configuration based on the dynamic network traffic information to redistribute traffic across less loaded LAG ports for load balancing.

4. The method of claim 1, wherein the dynamic network traffic information includes an identification of a particular protocol of traffic received by the node.

5. The method of claim 4, wherein the LAG configuration instructs the LAG node to forward a particular protocol of traffic only over the first LAG link.

6. The method of claim 1, wherein the SDN controller determines the latency sensitivity of a type of traffic based on the dynamic network traffic information.

7. The method of claim 1, wherein the hardware capability information includes the capacity of each LAG port of each LAG of the LAG node.

8. The method of claim 1, wherein the hardware capability information identifies hardware capabilities of the first LAG link and the second LAG link.

9. The method of claim 1, further comprising:
querying, with the SDN controller, each controlled node in the SDN to determine whether each queried node has LAG ports; and
receiving, with the SDN controller, a response from each queried node with LAG functionality, information identifying LAG ports on the queried node.

10. The method of claim 1, wherein a first determined LAG configuration is provided to the LAG node for use during a first time period, and
wherein a second determined LAG configuration is provided to the LAG node for use during a second time period.

11. A software-defined network (SDN) controller comprising:
a processor; and
a memory including instructions, the instructions, when executed by the processor, causing the SDN controller to:
determine a link aggregation (LAG) configuration for a LAG node controlled by the SDN controller based on hardware capability information and dynamic network traffic information of the SDN,
wherein the LAG configuration instructs the LAG node to forward a particular protocol of traffic only over a first LAG link; and
instruct the LAG node to forward traffic in accordance with the LAG configuration.

12. The SDN controller of claim 11, wherein the instructions further cause the SDN controller to:
query the LAG node to provide the SDN controller with information regarding individual LAG ports of the LAG node, including a LAG port associated with the first LAG link.

13. The SDN controller of claim 11, wherein the instructions further cause the SDN controller to:
query the LAG node to determine individual physical ports that are part of each LAG link on the LAG node.

14. The SDN controller of claim 11, wherein the instructions further cause the SDN controller to:
include flow rules in the LAG configuration, the flow rules including actions to perform on a packet received by the LAG node based on control metadata of the packet.

15. A non-transitory machine-readable storage medium encoded with instructions executable by a processor, the instructions comprising:
instructions to determine, with a software-defined network (SDN) controller in an SDN, a link aggregation (LAG) configuration for a LAG node controlled by the SDN controller, the LAG configuration including flow rules for LAG ports of the LAG node and being based on hardware capabilities and dynamic network traffic information of the SDN; and
instructions to instruct, with the SDN controller, the LAG node to forward traffic in accordance with the LAG configuration, including instructing the LAG node to forward a particular protocol of traffic only over a first LAG link.

* * * * *